(No Model.)
S. F. WEAVER.
FEED BOX.
No. 487,308. Patented Dec. 6, 1892.
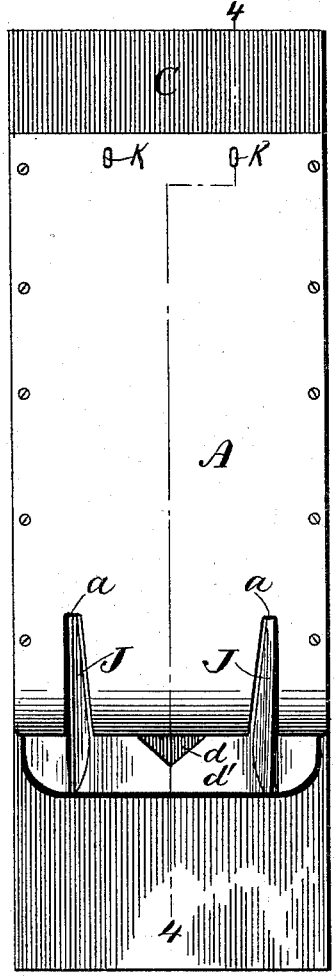
Fig. 1.
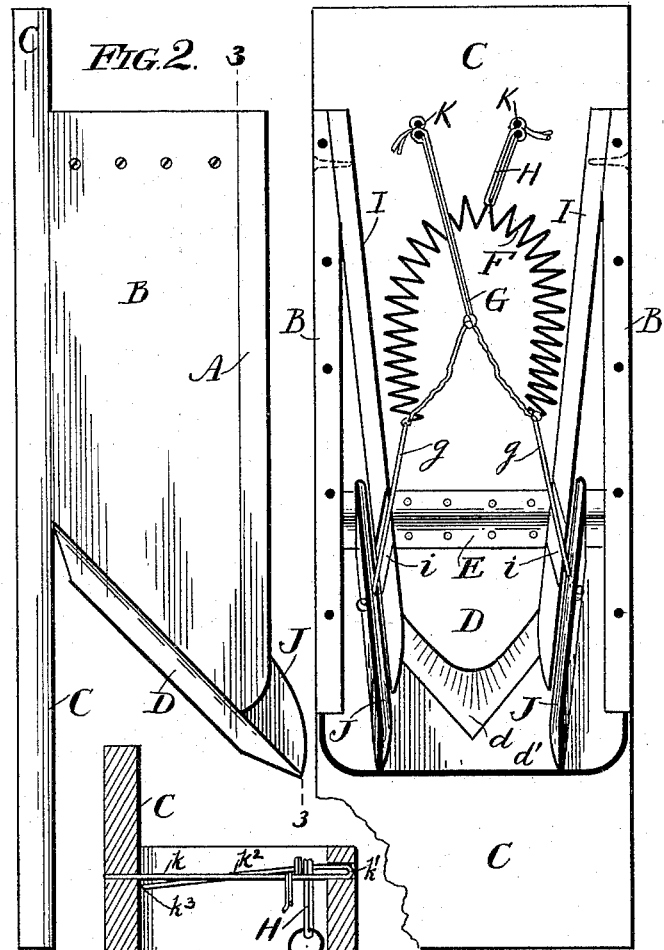
Fig. 2.
Fig. 3.
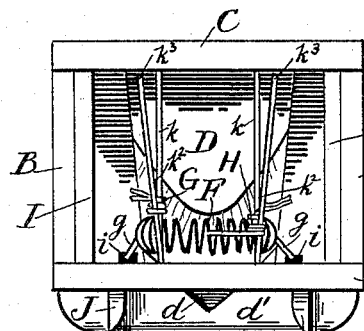
Fig. 5.
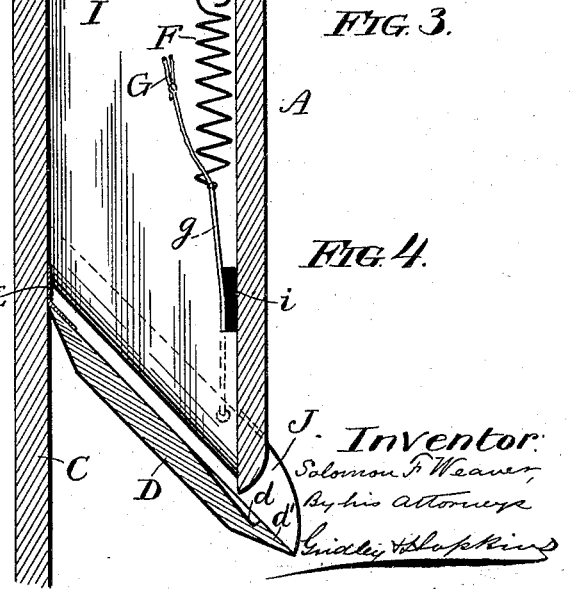
Fig. 4.
Witnesses:
J. Halpenny
Randall H. Burns
Inventor:
Solomon F. Weaver,
By his Attorneys
Gridley & Hopkins
THE NORRIS PETERS CO., PHOTO-LITHO., WASHINGTON, D. C.

UNITED STATES PATENT OFFICE.

SOLOMON F. WEAVER, OF DOWNS, KANSAS.

FEED-BOX.

SPECIFICATION forming part of Letters Patent No. 487,308, dated December 6, 1892.

Application filed January 11, 1892. Serial No. 417,675. (No model.)

*To all whom it may concern:*

Be it known that I, SOLOMON F. WEAVER, a citizen of the United States, residing at Downs, in the county of Osborne and State of Kansas, have invented certain new and useful Improvements in Feed-Boxes, of which the following is a specification.

The object of my present invention is to provide a device that shall so regulate the supply of feed that the animal cannot get too much into its mouth, and in this way the liability of the animal's wasting the feed or swallowing it insufficiently masticated is reduced to a minimum. To this end I use a feed-box having a hinged bottom, a portion of which projects beyond the box, so arranged that when pressed upon by the nose of the animal the box will be opened and a small quantity of feed allowed to escape into a trough of suitable construction arranged to catch it and out of which the animal eats, a spring being provided for returning the bottom to normal or closed position as soon as the pressure is removed and a bait being arranged on the projecting portion of the bottom for attracting the animal's attention.

The invention consists in certain features of novelty that are particularly pointed out in the claims hereinafter, and in order that it may be fully understood I will proceed to describe it with reference to the accompanying drawings, which are made a part hereof, and in which—

Figures 1 and 2 are respectively a front and a side elevation of the improved feed-box. Figs. 3 and 4 are vertical sections thereof on the lines 3 3 and 4 4, respectively. Fig. 5 is a plan view thereof.

A, B, B, and C are four pieces of board or other suitable material secured together by any suitable means, so as to form a box open at both top and bottom. The lower ends of the side pieces B B are beveled off, so as to give the bottom of the box a slope of, say, forty-five degrees, and the back C extends at both top and bottom beyond said sides in order to afford convenient means for securing the box to a post, stall, or other suitable support.

D is the bottom proper, secured to the back C by a hinge E, preferably made of a strip of leather or similar material and held in its normal or elevated position by the tensile strength of a coiled spring F. In the top side of the bottom D is formed a depression, preferably of V shape, a portion $d$ of which is located in a portion $d'$ of the bottom which projects beyond the box, so that when grain or other fine feed is put in the box some of it will enter the depression $d$ and be in sight. The animal in attempting to get this little bait will press upon the projecting portion $d'$ of the bottom and in so doing overcome the force of the spring F and depress the bottom, thus permitting a portion of the contents of the box to escape and fall into a trough arranged to catch it. The animal will then abandon the bait and go for the feed that has fallen into the trough and the spring F will restore the bottom to normal position and thus prevent the further discharge of feed as soon as the pressure is removed from the projecting portion of the bottom. As soon as the animal has eaten the feed that fell into the trough it will return to the bait and in the same way cause another small quantity of feed to be discharged into the feed-trough. In this way the entire contents of the box (it being the intention that just enough for one meal shall be put into it at a time) is dropped into the feed-trough a small portion at a time, and the animal is prevented from getting too much into its mouth at a time.

A stop of suitable character is provided for limiting the downward movement of the bottom and the consequent discharge of feed. The stop shown in the drawings consists of a piece of twine G, fixed at its lower end to the bottom D and at its upper end removably fastened to any suitable supporting device. By lengthening the twine the possible downward movement of the bottom is increased and by shortening it it is decreased, and thus the discharge of feed may be made as fast or as slow as desired.

The spring F should be under sufficient initial tension to support the bottom and the contents of the box, and means are provided for regulating this tension. The means shown in the drawings consists of a piece of twine H, secured to the upper part of the spring and removably fastened to any suitable device that will sustain the strain. The spring could be located outside of the box; but I prefer to carry it up through the box, because every time it is stretched or contracts it agitates the feed and thereby prevents it from packing or choking. In order to increase its efficiency as an agitator, I prefer to bend it into U shape inverted and connects it two ends with the bottom, the twine H that supports it being connected to the curved central portion. When so arranged, every time it is stretched its curvature changes and thus the contents of the box are agitated.

In order to prevent grain or particles of whatever kind of feed the box is filled with from being caught between the box and the bottom as the latter closes, I arrange on the inside two partitions I I, which preferably diverge upward, extend from front to back and terminate some distance—say half an inch—from the bottom. With this much space between them it is not probable that anything will be caught between the partitions and the bottom; but in order to still further lessen the liability the partitions are beveled off to a thin edge. Should any of the feed pass under the partitions, it will be prevented from reaching the sides B B by two flanges J J, which are secured to and project upward from the bottom. The flanges extend clear across the bottom from the hinged side thereof, thus forming a trough down which the feed slides, but from which it cannot escape at the sides.

The front of the box is notched for the reception of the flanges. They preferably converge and their outer ends prevent the breath of the animal from scattering the feed beyond the trough arranged to receive it.

In order to prevent the entrance of such substances as would choke the box, a grating is arranged across the top of it. This grating is preferably formed of two pieces of wire K, each of which has a portion $k$, that extends across the box from front to back and is bent at $k'$, has a portion from $k'$ to $k^2$ that is parallel with the portion $k$, and has a portion from $k^2$ to $k^3$ that diverges from said portion $k$ and extends nearly to the back C. This latter portion may, if desired, extend quite to the back, and a further extension of the wire may extend therefrom to the front of the box. The object of this particular arrangement of the wires is to form a convenient device to which the twines G and H may be fastened. By drawing the twines between the parallel portions of the wires, then wrapping them a few times around the wires, and then again drawing them between the wires they are anchored securely and so as to be readily removable for readjustment.

The bottom D is preferably a trifle narrower than the box, so that the box may be secured with its side flat against another object without interfering with the movement of the bottom.

I desire to have it understood that in its broadest sense my present invention is not limited to the details of construction and the auxiliary devices that are shown and described. So far as I am aware I am the first to construct a feed-box with a movable bottom held up by a yielding force and having a portion that projects beyond the box proper and has a receptacle in which is arranged a bait for attracting the animal's attention.

The trough for catching the feed that falls from the box is not shown in the drawings. In fact, such a trough is not absolutely necessary, and if one is desired any box or other receptacle will answer the purpose.

The lower portions $g\ g$ of the twine G constitute the means for attaching the lower ends of the spring F to the bottom D, and the partitions I I are provided with notches $i\ i$, through which said twine passes.

What I claim as new, and desire to secure by Letters Patent, is—

1. The combination of a box, a hinged bottom having a portion projecting beyond the box, and a coiled spring connected with the bottom for holding it normally closed and situated within the box so as to agitate the contents when the bottom is moved, substantially as set forth.

2. The combination of a box, a bottom hinged thereto and having a portion projecting beyond the box, and a coiled spring of inverted-U shape situated within the box and connected with the bottom for holding it normally closed, substantially as set forth.

3. The combination of a box having the bottom of its sides beveled off, the bottom D, hinged to the back C and having the projecting portion $d'$ and the bait-receptacle $d$, and means for holding said bottom normally elevated, substantially as set forth.

4. The combination of the box, the hinged bottom D, having the portion $d'$ projecting beyond the box, means for holding said bottom normally closed, and the partitions I, situated within the box and extending from front to back and nearly to the bottom thereof, substantially as set forth.

5. The combination of the box, the hinged bottom having the projection $d'$ and bait-receptacle $d$, the flanges J, projecting upward from said bottom and forming a trough, and means for holding said bottom normally closed, substantially as set forth.

6. The combination of the box, the hinged bottom having the projection $d'$ and bait-receptacle $d$, the flanges J, projecting upward from said bottom, the partitions I, extending downward between said flanges nearly to the bottom, and means for holding the bottom normally closed, substantially as set forth.

7. The combination, with the box and the hinged bottom, of the wires K, having portions that are parallel and other portions that diverge and a flexible device connected to the bottom and adapted to be secured between the parallel portions of said wires, substantially as set forth.

SOLOMON F. WEAVER.

Witnesses:
L. M. HOPKINS,
J. HALPENNY.